United States Patent [19]

Wolowicz

[11] 4,124,180
[45] Nov. 7, 1978

[54] FREE WING ASSEMBLY FOR AN AIRCRAFT

[75] Inventor: Chester H. Wolowicz, Lancaster, Calif.

[73] Assignee: The United States of America as represented by the Administrator of the National Aeronautics and Space Administration, Washington, D.C.

[21] Appl. No.: 831,634

[22] Filed: Sep. 8, 1977

[51] Int. Cl.² ............................................. B64C 9/10
[52] U.S. Cl. ......................................... 244/82; 244/48; 244/90 R
[58] Field of Search ............. 244/48, 82, 45 A, 89, 244/90 R, 90 B

[56] References Cited

U.S. PATENT DOCUMENTS

| 2,428,194 | 9/1947 | Bockrath | 244/82 |
| 2,960,285 | 11/1960 | Lopez | 244/82 |
| 3,614,033 | 10/1971 | McCarty, Jr. | 244/48 |
| 3,730,459 | 5/1973 | Zuck | 244/48 |

FOREIGN PATENT DOCUMENTS

| 575,336 | 12/1930 | Fed. Rep. of Germany | 244/82 |
| 26,635 | 2/1914 | United Kingdom | 244/82 |
| 511,188 | 8/1939 | United Kingdom | 244/82 |

*Primary Examiner*—Galen L. Barefoot
*Attorney, Agent, or Firm*—Paul F. McCaul; John R. Manning; Monte F. Mott

[57] ABSTRACT

A free wing attached to a fuselage of an aircraft in a manner such that the wing is free to pivot about a spanwise axis forward of its aerodynamic center. The wing is angularly displaced about the axis by aerodynamic pitching moments, resulting from lift, and is trimmed through a use of a trimmable free stabilizer comprising a floating canard mounted on a strut rigidly connected to the wing and forwardly projected therefrom.

4 Claims, 15 Drawing Figures

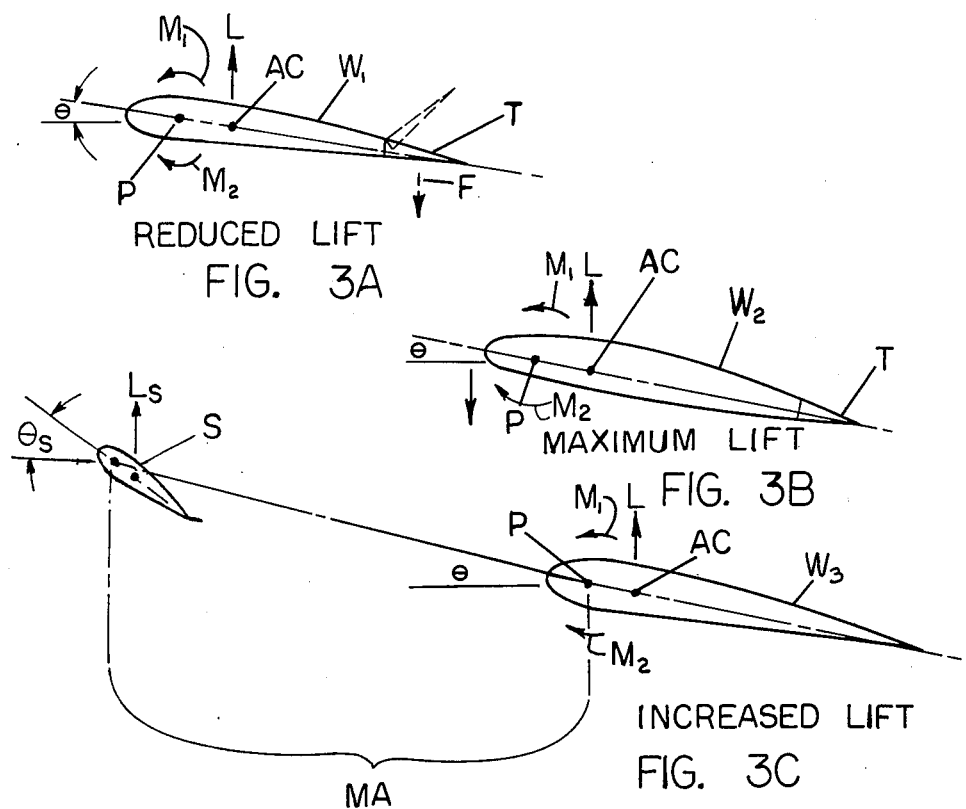
REDUCED LIFT
FIG. 3A
MAXIMUM LIFT
FIG. 3B
INCREASED LIFT
FIG. 3C
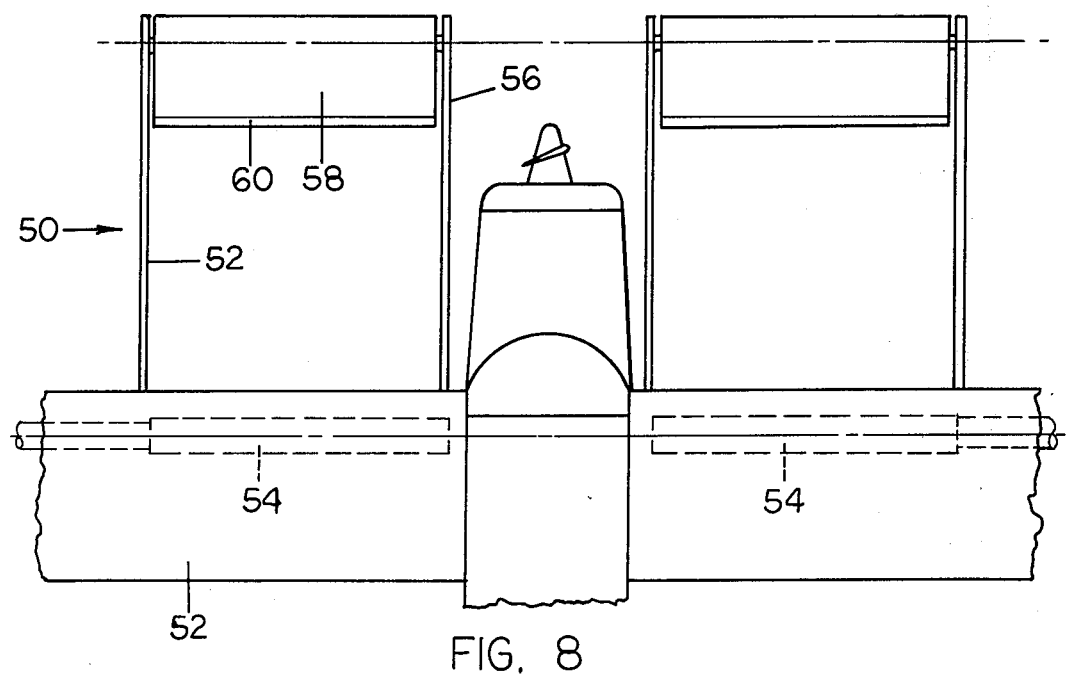
FIG. 8

FREE WING ASSEMBLY FOR AN AIRCRAFT

ORIGIN OF THE INVENTION

The invention described herein was made by an employee of the United States Government and may be manufactured and used by or for the Government for Governmental purposes without the payment of any royalties thereon or therefor.

BACKGROUND OF THE INVENTION

1. Field of the Invention

The invention generally relates to free wings for aircraft and more particularly a free wing attached to a fuselage of an aircraft in a manner such that the wing is free to oscillate about a spanwise axis forward of its aerodynamic center as it is subjected to aerodynamic pitching moments imposed by lift and drag forces. The wing is trimmed through a use of a free canard which serves as stabilizer for controlling the angle of attack of the wing.

The so-called "simple free wing" embodies a concept of an unconventional attachment of a wing to a fuselage in a manner such that the wing is free to pivot about its spanwise axis forward of its aerodynamic center, and is subject only to aerodynamic pitching moments imposed by wing lift and drag.

Among the various advantages realized when employing a free wing are alleviation of gust loads, simplicity in fuselage design, extension of travel limits for center of gravity, improved fuselage attitude trim, avoidance of fuselage rotation at lift-off and landings, and increased freedom in design location for landing gear.

2. Description of the Prior Art

Heretofore, numerous attempts have been made to provide for conventional aircraft, particularly in the field of general aviation, a practical free wing, whereby the numerous advantages, some heretofore enumerated, more readily can be realized. Among the approaches heretofore taken are embraced in the teachings of U.S. Pat. No. 2,347,230 to Zuck. Of course, a free wing must be trimmed if it is to serve a practical purpose. Patentee Zuck suggests a use of control surfaces comprising trailing edge flaps for this purpose.

While the patented free wing, generally speaking, may function satisfactorily for its intended purpose, it should readily be appreciated that the free wings of the prior art suffer a common inadequacy in that not only is drag increased as a consequence of negative flap deflection, but the effective surface area of the wing is decreased with an attendant loss in the lift coefficient as lift producing capabilities of the wing. This characteristic of the patented free wing becomes particularly significant when the aircraft is on final approach and/or during takeoff, as can readily be appreciated by those familiar with the handling of aircraft in flight.

It is therefore the purpose of the instant invention to provide a free wing having a capability of achieving pitch trim, without experiencing an attendant loss of lift coefficient whereby the known advantage of the free wing may be realized while the recognized disadvantages which heretofore plagued designers of free wings are avoided.

OBJECTS AND SUMMARY OF THE INVENTION

It is an object of the instant invention to provide an improved free wing for conventional aircraft.

It is another object to provide a free wing for conventional aircraft having improved gust alleviation characteristics.

It is another object to provide an improved free wing characterized by a higher lift coefficient during periods of slow flight.

It is another object to provide in combination with a free wing transversely related to the fuselage of a conventional aircraft a free stabilizer comprising a trimmable canard for use in achieving pitch trim of the wing, without impairing the lift coefficient of the wing.

It is another object to provide in combination with an aircraft characterized by an elongated fuselage and a free wing transversely related to the fuselage, a strut-supported stabilizer comprising a free wing panel integrally related with the free wing and employed for minimizing degradation in the slope of the lift curve as the angle of attack for the wing is increased.

It is another object to provide in combination with an aircraft characterized by an elongated fuselage having a power plant affixed thereto a free wing for accommodating thrust vectoring without varying the angle of attack for the free wing.

It is another object to provide for a free wing a free stabilizing control surface mounted in a configuration conforming to a floating canard through which pitch for the wing is achieved in flight without reducing the lift coefficient for the wing.

These together with other objects and advantages are achieved through the use of a free wing panel connected through a strut to a free wing, in spaced relation therewith, and adapted to function as a trimmable free stabilizer, whereby the angle of attack for the free wing is dictated by the lift produced by the wing panel, as will become more readily apparent by reference to the following description and claims in light of the accompanying drawings.

BRIEF DESCRIPTION OF THE DRAWINGS

FIG. 3A is a diagrammatic view illustrating the effects of negative flap deflection on lift providing characteristics of a known free wing.

FIG. 3B is a diagrammatic view illustrating the effects of a neutralized flap on lift producing characteristics of a known free wing.

FIG. 3C is a schematic view illustrating the effects of a strut-supported free stabilizer on the lift producing characteristics of a free wing which embodies the principles of the instant invention.

FIG. 8 is a fragmented top plan view of a modified form of the instant invention.

DESCRIPTION OF THE PREFERRED EMBODIMENT

Figure 1:
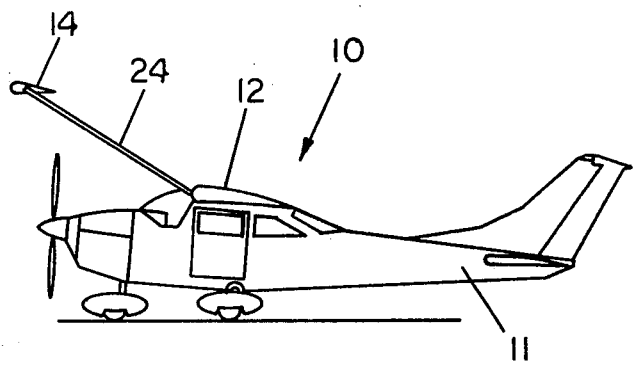
FIG. 1 is a side elevational view of a conventional aircraft equipped with a free wing and free stabilizer which embodies the principles of the instant invention.
Figure 2:
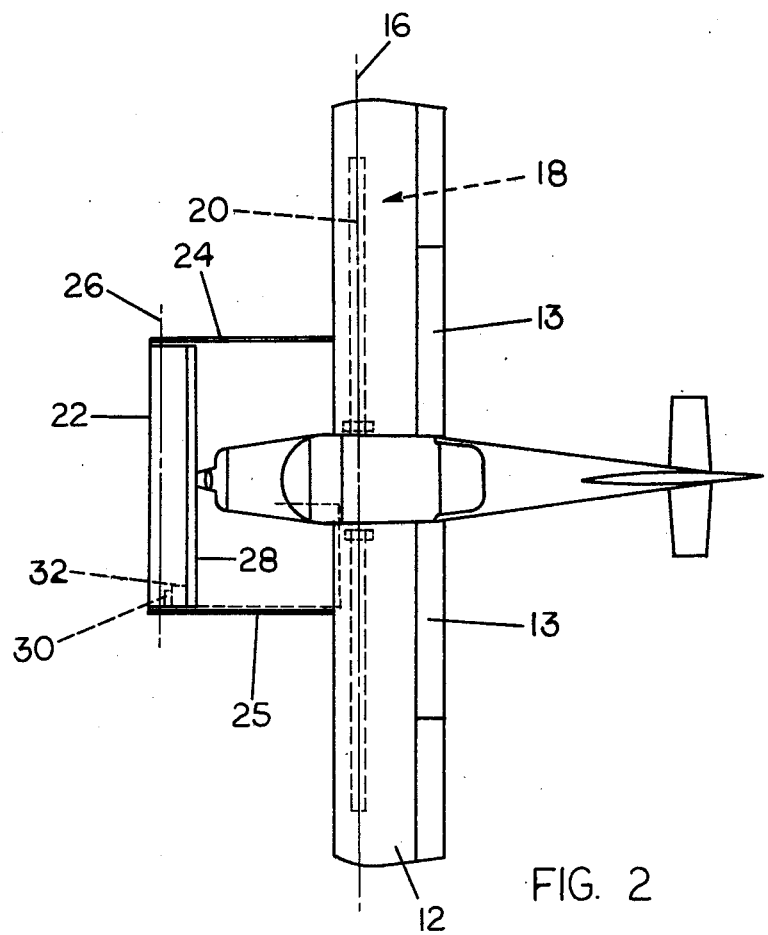
FIG. 2 is a top-plan view of the aircraft shown in FIG. 1.

Referring now to the drawings wherein like reference characters desginate like or corresponding parts throughout the several views, there is shown in FIG. 1 a light aircraft equipped with an improved free wing and trimmable floating canard, herein referred to as a free stabilizer, which embodies the principles of the instant invention.

As shown, the aircraft, designated 10, includes a fuselage 11 of a generally known configuration to which is pivotally connected a free wing 12, in accordance with the principles of the instant invention. A free stabilizer 14 is attached to the wing and provided for controlling the attitude thereof, whereby the instantaneous angle of attack for the wing 12 is a function of the angle of attack for the stabilizer 14, as will hereinafter become more readily apparent.

At the outset, it is to be understood that while the aircraft as shown in FIG. 1 is a so-called high-wing aircraft, the invention may be employed equally as well for mid-wing and/or low-wing aircraft.

The wing 12 is supported for free oscillation about the spanwise axis 16. As a practical matter a suitable suspension assembly, generally designated 18, is employed for this purpose. While any suitable suspension is utilized in connecting the wing 12 to the fuselage 11, the suspension assembly 18, as shown, includes a tubular sleeve 20 mounted in concentric relation with a transverse spar, not designated, supported thereby for free oscillatory motion so that the wing 12 is free to oscillate about the spanwise axis 16. It is to be understood, of course, that the sleeve 20 is considered illustrative of a family of suspension assemblies which serve to pivotally suspend the fuselage 11 from the spar of the wing 12.

The free stabilizer 14 conforms generally to the configuration of a floating canard and includes a trimmable wing panel 22 suspended between a pair of supporting struts 24. These struts are extended in substantial parallelism angularly from the leading edge portion of the free wing 12. As illustrated, the struts 24 are suitable affixed to the wing 12 and project upwardly and forwardly therefrom in order to avoid creating turbulence in leading relation with the wing 12.

The wing panel 22 also is supported for free oscillatory motion about a spanwise axis, designated 26. The panel 22 is, where desired, mounted on a bearing sleeve, not shown, similar in design and function to the sleeve 20. The angle of attack for the wing panel 22 is controlled by a trim tab 28 provided in the form of a trailing edge flap in substantially the same manner as is the trim tab for the free-wing disclosed by the patentee Zuck, aforementioned.

As a practical matter, the trim tab 28 is pivotally connected with the wing panel 22 through a hinge, not designated, and is deflected through selective operation of a suitable actuator 30. Preferably, the actuator 30 is connected to the trim tab 28 through a suitable push-pull linkage designated 32.

The actuator 30, as shown, comprises a DC motor mounted within the wing panel 22 and connected with a DC voltage source, not designated, as is normally provided for light aircraft. Electrical circuit leads extended through the struts 24 are employed as desired for effecting a connection of the actuator with the voltage source. In any event, it is to be understood that the trim tab 28 through selective deflection is utilized for controlling the attitude of the wing panel 22 and thus is utilized for selectively establishing a desired angle of attack therefor.

Digressing for a moment, attention is invited to FIG. 3A, wherein is illustrated a free wing $W_1$ of the type generally disclosed by the patentee Zuck, it can be seen that where the aerodynamic center AC of the wing is located aft of its pivot P, lift L acts through a moment arm, having a length equal to the distance between AC and P, to establish a pitch moment $M_1$, about the pivot P. In order to oppose the pitch moment $M_1$ a trim tab T, or trailing edge flap, is provided for the wing $W_1$ and deflected, negatively as illustrated in dashed lines, for developing a force F for thus causing a pitch control moment $M_2$ to be established about the pivot P. The moment $M_2$ acts in opposition to the moment $M_1$, for thus achieving a stabilized condition for the wing $W_1$ at a given air speed. Negative deflection of the flap, of course, tends to reduce the aerodynamic surface of the wing and thus tends to decrease the lift coefficient for the wing.

On the other hand it can be seen that where a wing, designated $W_2$, FIG. 3B, does not include a tab or where the tab T is neutralized the aerodynamic surface of the wing is maximized, but the pitch control moment $M_2$ therefor is decreased, so that the angle of attack $\theta$ for the wing $W_2$ decreases with an attendant net loss of lift L. At a given air speed, of course, a value for lift L will be established so that a stable angle of attack $\theta$ for the wing $W_2$ ultimately will be achieved. However, lift L at this air speed will be minimal.

With reference to FIG. 3C it is noted that where a wing, designated $W_3$, is stabilized by a free stabilizer S having a wing panel corresponding to wing panel 22 trimmed by a trim tab comprising a trailing edge flap, similar to flap 13, the pitch moment $M_1$ is opposed by a pitch control movement $M_2$. This moment results from the force of lift $L_S$ for the free stabilizer and acts through a moment arm of a length MA. Hence, a given angle of attack $\theta$ can be established and stabilized by maintaining and established angle of attack $\theta'$ for the free stabilizer.

It should now be apparent that simply by increasing the angle of attack for the panel 22 an increase in the pitch control moment results as the lift of the wing panel 22 acts through the strut 24 in opposition to a pitch moment resulting from lift experienced by the wing 12. Moreover, the position of the trim tab 28 controls the angle of attack for the panel 22. Thus the force applied through the struts 24 to the wing 12, about the axis 16, in opposition to pitch moment resulting from lift of the wing serves to stabilize the wing. This force is in practice varied by varying the negative deflection of the trim tab 28.

It also is important to understand that by establishing a limit for the throw of the trim tab 28 it is possible to establish the maximum lift which may be developed by the panel 22 for a given air speed. Consequently it is possible to limit the angle of attack of the wing 12 to something less than the stall angle, normally 20°, in order to assure that the wing 12 is incapable of achieving a stall condition and thus "stall-proof" the aircraft for thus enhancing the operational safety factor thereof.

Figure 7A:
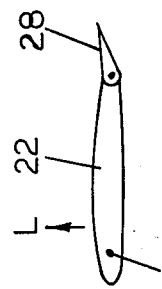
FIGS. 7A – 7C collectively illustrate gust alleviation of the stabilizer shown in FIGS. 1 and 2.
Figure 7B:
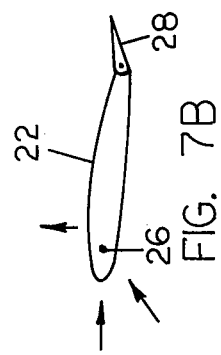
Figure 7C:
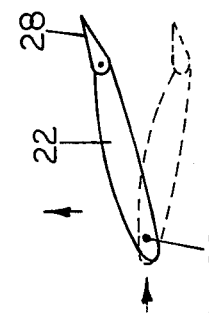

Moreover, it will be appreciated by those familiar with the hazards of slow-flight, in many instances alleviation of the effects of wind gusts is desirable. Referring now to FIGS. 7A - 7C, wherein is collectively illustrated gust loading reponse for the wing panel 22, it is noted that with negative deflection of the trim tab 28, FIG. 7A, a stabilized condition for the wing panel is achieved, provided, of course, that a constant air speed condition exists. Because of the stabilized condition for the wing panel 22 the angle of attack for the wing 12 is stabilized.

Assume, for the moment, that the wing panel 22 is subject to a gust load, identified by the reference charter G, FIG. 7B, the angle of attack for the wing panel 22 and, consequently the wing 12 will be increased unless application of the full force of the gust load G is avoided. Hence, provided that the coefficient inertia for the wing panel 22 is low enough, the panel 22 is permitted to oscillate about the axis 26, FIG. 7C, in a fluttering fashion whereby the effect of the gust load is substantially avoided.

Since the mass of the wing 12 is far greater than the mass of the wing panel 22, the stabilizing forces acting on the wing panel 22 and the high coefficient of inertia for the wing, collectively, act to oppose oscillation of the wing 12 as gust loading of the wing occurs. Hence, the fluttering of the wing panel 22 has little effect on the angle of attack for the wing 12.

It should now be apparent that due to the low inertia characteristics of the wing panel 22 this panel tends to assume a flight configuration determined by the setting of the trim tab 28 immediately following the termination of gust loading.

Figure 4A:
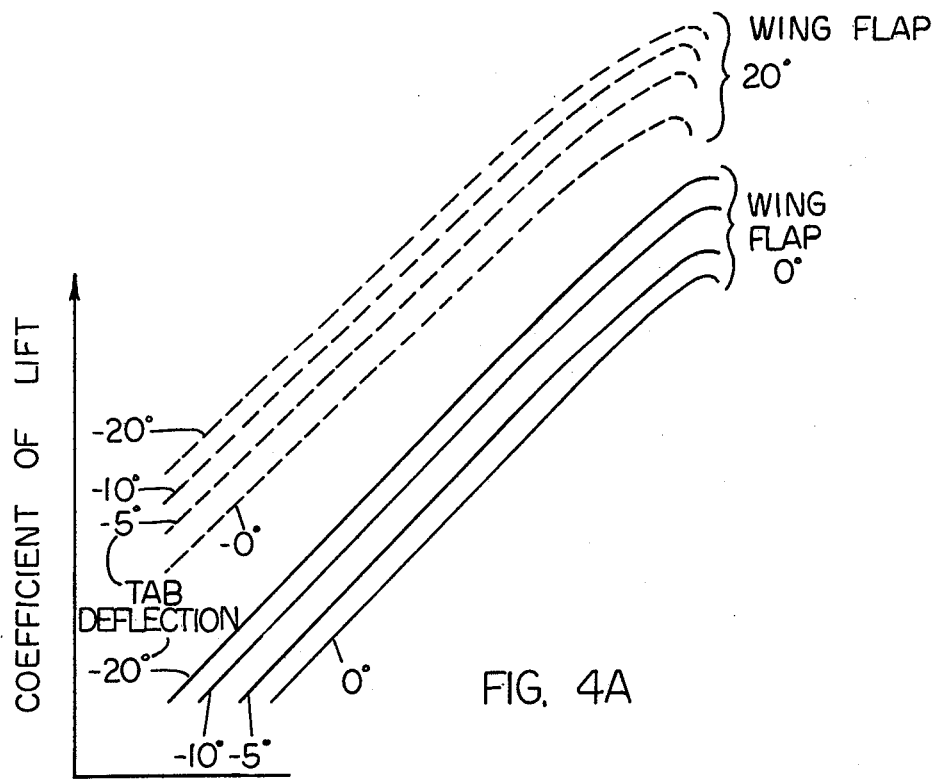
FIG. 4A is a graphic illustration of the longitudinal characteristics of the wing shown in FIG. 3C when employed with plain flaps.

Turning now to FIG. 4A wherein is illustrated a longitudinal characteristic typical of the free wing $W_3$, as shown in FIG. 3C, when employed with conventional plain flaps, not shown. As is well known, such flaps are employed for both increasing the lift coefficient of a wing as well as inducing drag. It can be seen that with 0° plain wing flap extension and 0° deflection of the trim tab or trailing edge flap for the wing panel of the stabilizer S, the coefficient of lift increases linearly as the positive angle of deflection for the wing $W_3$ is increased in response to increased lift $L_S$. Similar conditions prevail with the plain flaps of the wing $W_3$ extended 20°, as indicated by the dash lines, FIG. 4A, but, of course, at substantially greater values for the coefficient of lift for the wing due to the positive deflection of the plain flaps.

Similar results are achieved for the wing $W_3$ as negative deflection of the trim tab for the wing panel of the stabilizer S is increased through negative deflection angles −5°, −10°, −20°, as illustrated, regardless of the extended configuration of the plain flaps. Hence, a linear increase in the coefficient of lift can be expected to occur as the wing panel of the stabilizer S is deflected through its normal operating range, with the plain flaps thereof in either an extended or retracted condition.

Figure 4B:
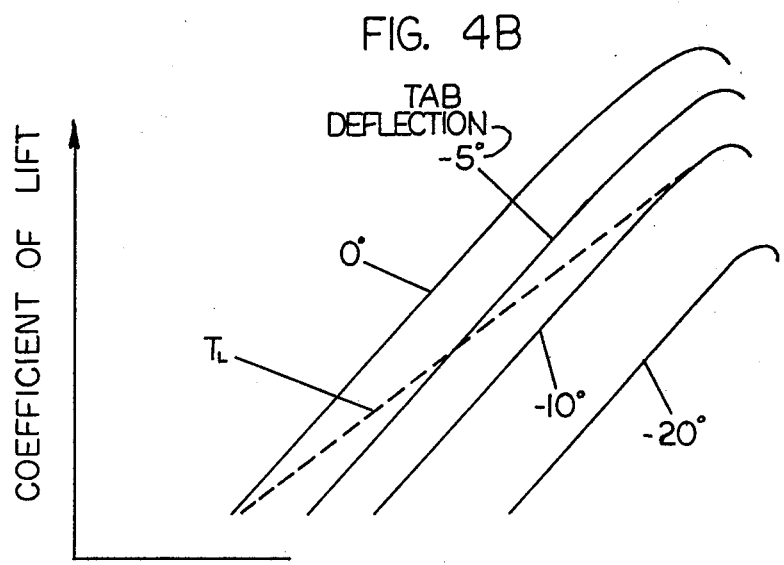
FIG. 4B is a graphic illustration of the long characteristics of the wing depicted in FIG. 3A, when employing plain flaps.

As a matter of interest, the longitudinal characteristics typical of the wing $W_3$ of FIG. 3C differ substantially from those which typify the free wing $W_1$, FIG. 3A, equipped with trailing edge tabs or flaps T, as depicted in FIG. 3A. The coefficient of lift for the free wing $W_3$ is constantly maximized throughout its range of deflection due to the absence of negative deflection trailing edge flaps or tabs. It should be apparent, from a review of FIG. 4B, that a maximum coefficient of lift for the free wing $W_1$ can be expected to be achieved with the flap T at neutral or 0° deflection due to the maximized effective aerodynamic surface. Moreover, as the negative deflection of the flap T is increased through negative angles −5°, −10°, −20° the lift coefficient decreases, even though the angle of attack of the wing $W_1$ is increased, simply because of reduction in the effective aerodynamic surface of the wing and an attendant increase in drag. Hence, for a given setting of the flap T, for thus establishing a given air speed and angle of attack for the wing $W_1$ the lift coefficient of the wing will fall, generally, along a trim/lift curve identified $T_L$, FIG. 4B.

Figure 6A:
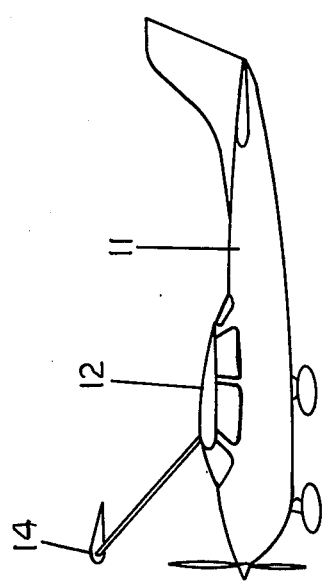
FIG. 6A and 6B collectively illustrate a variable relationship established between a free wing and its associated fuselage for both free wing aircraft of the prior art and the free wing aircraft which embodies the principles of the instant invention.
Figure 6B:
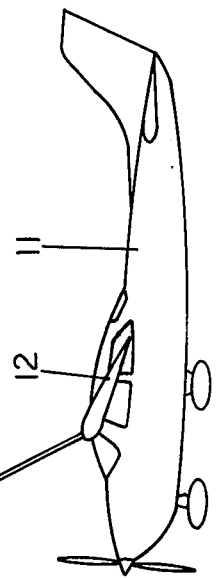
Figure 5A:
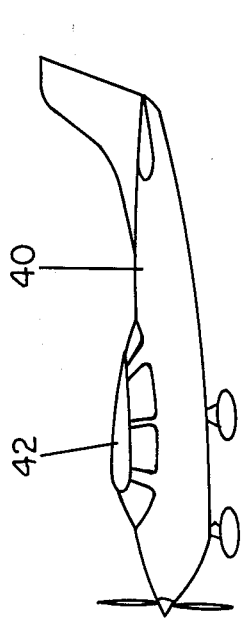
FIG. 5A and 5B collectively illustrate a conventional relationship established between a wing and a fuselage for a conventional aircraft during both level flight and climb.
Figure 5B:
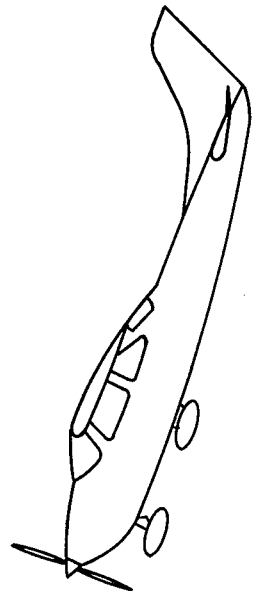

Turning back to FIGS. 5A and 5B, wherein is illustrated a conventional fixed wing aircraft characterized by fuselage designated 40 and a wing 42 rigidly affixed thereto, it is noted that the attitude of the fuselage 40 necessarily is altered as the pitch of the wing, designated 42, is altered. However, as illustrated in FIGS. 6A and 6B the attitude of the fuselage 11 remains substantially constant regardless of the angle of attack established for the wing 12 trimmed by the stabilizer 14. Hence, it is possible to trim either the fuselage or the wing in flight, independently of the other, for thus achieving enhanced stability with numerous attendant advantages readily appreciated by those familiar with the operation of light aircraft. For example, it is possible to trim the fuselage for purposes of achieving thrust vectoring for the aircraft without varying the angle of attack for the wing.

It should at this point become apparent that the stabilizer 14 may be mounted in a trailing relationship with the wing 12, as well as in a leading configuration as hereinbefore described, and that the configuration is altered as desired.

ALTERNATE EMBODIMENT

Attention is now directed to FIG. 8 wherein is illustrated an alternate embodiment of the invention previously described and illustrated in FIGS. 1 through 7C.

The embodiment illustrated in FIG. 8 includes a pair of free stabilizers 50 separately mounted on a pair of free wings designated 52. Each of these wings is supported for oscillation independently of the other through a use of a sleeve 54, similar in design to the sleeve 20. Mounted on each of the wings 52 is a pair of struts 56 between which is supported a wing panel 58 coupled to the struts for pivotal oscillation. Each of the panels 58 is pivotally supported by a suitable suspension assembly, not designated, and is displaceable about its spanwise axis independently of the other. A trim tab 60 coupling a trailing edge flap is provided for achieving pitch trim. Deflection of this tab occurs in response to an energization of an actuator, not shown but similar in design and function to the actuator 30, connected with the tab through a push-pull link. Hence, trim for the panel 58 is achieved in substantially the same manner as that in which trim for the wing panel 22 is achieved, as previously described.

In view of the foregoing it is to be understood that each of the free stabilizers 50 is independently connected to a free wing 52, whereby a selected attitude for each wing 52 is achievable independently of the attitude of the other wing. Thus, it is possible to alter the attitude of either of the wings 52 simply by altering the deflection of the corresponding trim tab 60 of one of the free stabilizers 50. Moreover, such deflection of the tabs for the stabilizers 50 is alternately or simultaneously effected as desired. Thus roll control is achievable through the use of multiple free stabilizers 50.

OPERATION

It is believed that in view of the foregoing description, the operation of the device will readily be understood and it will be briefly reviewed at this point.

When employing the wing 12, the fuselage 11 is stabilized through a use of control surfaces mounted on the empennage of the fuselage 12, since the weight of the fuselage is suspended from the wing and is free to pivot with respect thereto.

Simply by appropriately energizing the actuator 30 of the attitude stabilizer 14 the trim tab 28 is pivotally deflected for thus altering the angle of attack $\theta_s$ for the wing panel 22. As a consequence of the change in the angle of attack of the wing panel 22 the lift $L_S$ of the wing panel is varied. Since the lift $L_S$ acts on the wing 12 through struts 24, for causing the wing to rotate about the axis 16 changes in the lift of the wing panel 22 causes the angle of attack $\theta$ for the wing 12 to change as the wing is thus caused to rotate to a new attitude. Thus pitch or control over the wing is achieved.

When the free stabilizers 50 are employed for independently rotatable wings 52, roll control is achieved by selectively varying the deflection of the trim tabs 60, alternately. Of course, simultaneous pitch control over the wings 52 is achieved through a simultaneous deflection of both trim tabs 60.

Although the invention has been herein shown and described in what are conceived to be the most practical and preferred embodiments, it is recognized that departures may be made therefrom within the scope of the invention, which is not to be limited to the illustrative details disclosed.

What is claimed is:

1. In combination with an elongated fuselage for an aircraft having a free wing characterized by an effective aerodynamic surface of a constant area and supported for unrestrained pivotal deflection about a spanwise axis forwardly related to the aerodynamic center of the wing, means for establishing a variable angle of attack for said wing comprising:

an airfoil supported for unrestrained pivotal deflection about an axis forwardly related to the aerodynamic center thereof and disposed in spaced parallelism with said spanwise axis, means for varying the lift of the airfoil including a deflectable trim tab connected to the trailing edge of said airfoil, and means for transferring the force of the lift for the airfoil to said wing for varying the pitch thereof including a pair of rigid struts interconnecting said airfoil with said wing.

2. A trimmable free-wing assembly for an aircraft characterized by a rigid elongated fuselage comprising:

A. a free wing including a pair of wing panels, each being configured to product lift, the force of which is proportional to the instantaneous angle of attack for the wing;

B. means connecting the wing panels to said fuselage at opposite sides thereof for free-floating deflection about a first spanwise axis forwardly related to the aerodynamic center of the wing, whereby the force of the lift establishes a pitch moment about said axis;

C. trimming means for establishing for said wing a variable angle of attack comprising a free-floating control surface disposed in spaced relation with said wing and configured to produce lift, the force of which is proportional to the instantaneous angle of attack for said control surface, means including a pair of rigid struts affixed to said wing forwardly of said first spanwise axis and projected therefrom supporting said control surface for deflection about a second spanwise axis forwardly related to the aerodynamic center thereof, whereby the force of the lift of said control surface is transferred to said wing through said pair of struts for establishing about said first spanwise axis a ptich control moment acting in opposition to said pitch moment, and means for trimming said control surface for varying the instantaneous angle of attack therefor whereby the magnitude of the pitch control moment acting in opposition to said pitch moment is responsively varied.

3. The assembly of claim 2 wherein said means for trimming said control surface comprises a trim tab supported at the trailing edge of the control surface for negative deflection.

4. The assembly of claim 3 wherein said control surface comprises one of a pair of similar control surfaces supported for independent deflection about a substantially common axis.

* * * * *